(12) United States Patent
Ohno et al.

(10) Patent No.: US 6,943,926 B2
(45) Date of Patent: Sep. 13, 2005

(54) OPTICAL SCANNER

(75) Inventors: Mitsuhiro Ohno, Saitama (JP);
Masanobu Yamamoto, Nara (JP)

(73) Assignee: Fujinon Corporation, Omiya (JP)

( * ) Notice: Subject to any disclaimer, the term of this patent is extended or adjusted under 35 U.S.C. 154(b) by 290 days.

(21) Appl. No.: 10/452,450

(22) Filed: Jun. 2, 2003

(65) Prior Publication Data

US 2003/0226958 A1 Dec. 11, 2003

(30) Foreign Application Priority Data

Jun. 7, 2002 (JP) ........................................ 2002-166932

(51) Int. Cl.[7] .............................................. G02B 26/08
(52) U.S. Cl. ....................... 359/196; 359/198; 359/871; 359/872
(58) Field of Search ................................ 359/196–226, 359/871–872, 896; 248/466, 474; 347/241, 243, 256, 261

(56) References Cited

U.S. PATENT DOCUMENTS 6,195,190 B1 * 2/2001 Tachibe et al. ............. 359/216
6,201,627 B1 * 3/2001 Ohno et al. ................ 359/206
6,813,052 B2 * 11/2004 Yoshizawa .................. 359/216

FOREIGN PATENT DOCUMENTS

JP  2001-337290  12/2001
JP  2001-337291  12/2001

* cited by examiner

Primary Examiner—James Phan
(74) Attorney, Agent, or Firm—Frommer, Lawrence & Haug LLP; Matthew K. Ryan, Esq.

(57) ABSTRACT

Provided is an optical scanner capable of preventing a temperature rise in a polygon mirror and its surrounding, and contributing to the prevention of degradation in image quality. Two cells (an inlet and an outlet) among a plurality of cells of a strengthening rib structure disposed in an optical base are connected through a passageway so as to form a flow path of outside air (air), and a bottom surface of a drive board forming part of an outer wall of a containing chamber and supporting a polygon mirror is exposed to the flow path (passageway). Even if a motor and a motor circuit disposed in the drive board generates heat during rotation of the polygon mirror, the drive board is directly cooled by the air flowing through the flow path, so a temperature rise in the polygon mirror and its surroundings can be prevented. Thereby, degradation in scanning characteristics of a laser beam due to deformation of an enclosure resulting from a temperature difference during heat generation can be prevented.

3 Claims, 8 Drawing Sheets

OPTICAL SCANNER

BACKGROUND OF THE INVENTION

1. Field of the Invention

The present invention relates to an optical scanner having a light beam scanning mechanism, and being mounted in an optical apparatus such as, for example, a full-color laser printer or the like.

2. Description of the Related Art

In recent years, according to a development in digital technologies, various kinds of image forming apparatuses (printers) are used as image data output apparatuses. Among them, a full-color laser printer is superior in, for example, image quality and output time.

A laser printer mainly comprises an optical system unit for image formation, that is, an optical scanner in an enclosure. In the optical scanner, when a laser beam is emitted from a light source mainly in a state in which a polygon mirror is rotating at constant speed by rotating a scan motor, the laser beam is reflected by the polygon mirror to be successively deflected, and the deflected laser beam repetitively scans a photosensitive drum. Then, an electrostatic latent image formed through scanning by the laser beam is developed by using a toner, and the developed image is transferred to a paper. Thereby, a desired image corresponding to the image data is formed on the paper. In a full-color laser printer, in order to reproduce a full-color image, for example, a light source apparatus including four light sources corresponding to four color, that is, yellow (Y), magenta (M), cyan (C), black (B) is mounted in the optical scanner, and four photosensitive drums corresponding to these four light sources are used to form an electrostatic latent image. In some cases, the polygon mirror for light deflection is contained in a closed-box-shaped containing chamber to prevent adhesion of dust, dirt or the like in the atmosphere to a reflective mirror surface.

More recently, in order to further reduce output time of the full-color laser printer, higher speed in image formation performance has been in demand. Accordingly, there has been a trend toward higher rotating speed of the scan motor.

However, when the rotating speed of the scan motor becomes higher, the amount of heat generated during rotation of the scan motor increases, thereby resulting in a temperature rise in the polygon mirror contained in the containing chamber, a motor for driving the polygon mirror, a motor drive circuit and their surroundings. When the temperature of the polygon mirror or the like rises, mainly a temperature difference in the enclosure occurs, and the enclosure is deformed resulting from the temperature difference. Scanning characteristics of the laser beam are impaired resulting from the deformed enclosure, so it is difficult to accurately form an image based upon image data, thereby resulting in degradation in image quality.

This problem is an important issue which must be overcome when a high quality full-color laser printer is designed, and in consideration of the expectation that the output time will be further reduced in future, it is necessary to prevent a temperature rise in the polygon mirror and its surroundings as much as possible, which may result in degradation in image quality.

Some specific techniques to overcome the above problem have been already proposed. For example, in Japanese Unexamined Patent Application Publication No. 2001-337290, Ono et al. disclosed a technique in which a cutting hole for thermal dissipation and a guiding path for inducing thermal dissipation are disposed in a bottom surface of an optical housing in order to prevent a temperature rise in the polygon mirror and its surroundings. However, the technique is applicable to the case where the containing chamber containing the polygon mirror is disposed in proximity to an outer surface of the optical housing, but it is difficult to apply the technique to the case where the containing chamber is disposed deep in the recesses of the optical housing.

Moreover, for example, in Japanese Unexamined Patent Application Publication No. 2001-337291, Ono et al. also disclosed a technique in which a duct for thermal dissipation is disposed on the outside of the optical housing. However, in the case of using the technique, the duct for heat dissipation is disposed, so the structure of the apparatus becomes complicated, and the manufacturing cost increases.

SUMMARY OF THE INVENTION

In view of the foregoing, it is an object to provide an optical scanner capable of preventing a temperature rise in a polygon mirror and its surroundings and contributing to the prevention of degradation in image quality.

An optical scanner according to the invention comprises: a light deflection apparatus deflecting a light beam for scanning a scanned surface; and an enclosure including a strengthening structure for enhancing mechanical strength and a containing portion containing the light deflection apparatus therein, wherein the containing portion includes a supporting body having an exposed surface exposed to outside, and supporting the light deflection apparatus, and an outside inlet path for guiding outside air to the exposed surface of the supporting body is formed by using part of the strengthening structure.

In the optical scanner according to the invention, the light deflection apparatus supported by the supporting body is contained in the containing portion in the enclosure, and the outside air inlet path for guiding outside air to the exposed surface of the supporting body is formed by using the strengthening structure disposed in the enclosure. Herein, "outside air" indicates air outside the containing portion in the atmosphere contained in the enclosure.

In the optical scanner according to the invention, the strengthening structure may have a honeycombed structure including a plurality of barrier ribs, and the outside air inlet path may be formed by using a space surrounded by the barrier ribs. In this case, the space surrounded by the barrier ribs may have a polygonal sectional shape.

Other and further objects, features and advantages of the invention will appear more fully from the following description.

DETAILED DESCRIPTION OF THE PREFERRED EMBODIMENTS

Preferred embodiments of the present invention are described in more detail below referring to the accompanying drawings.

Figure 1:
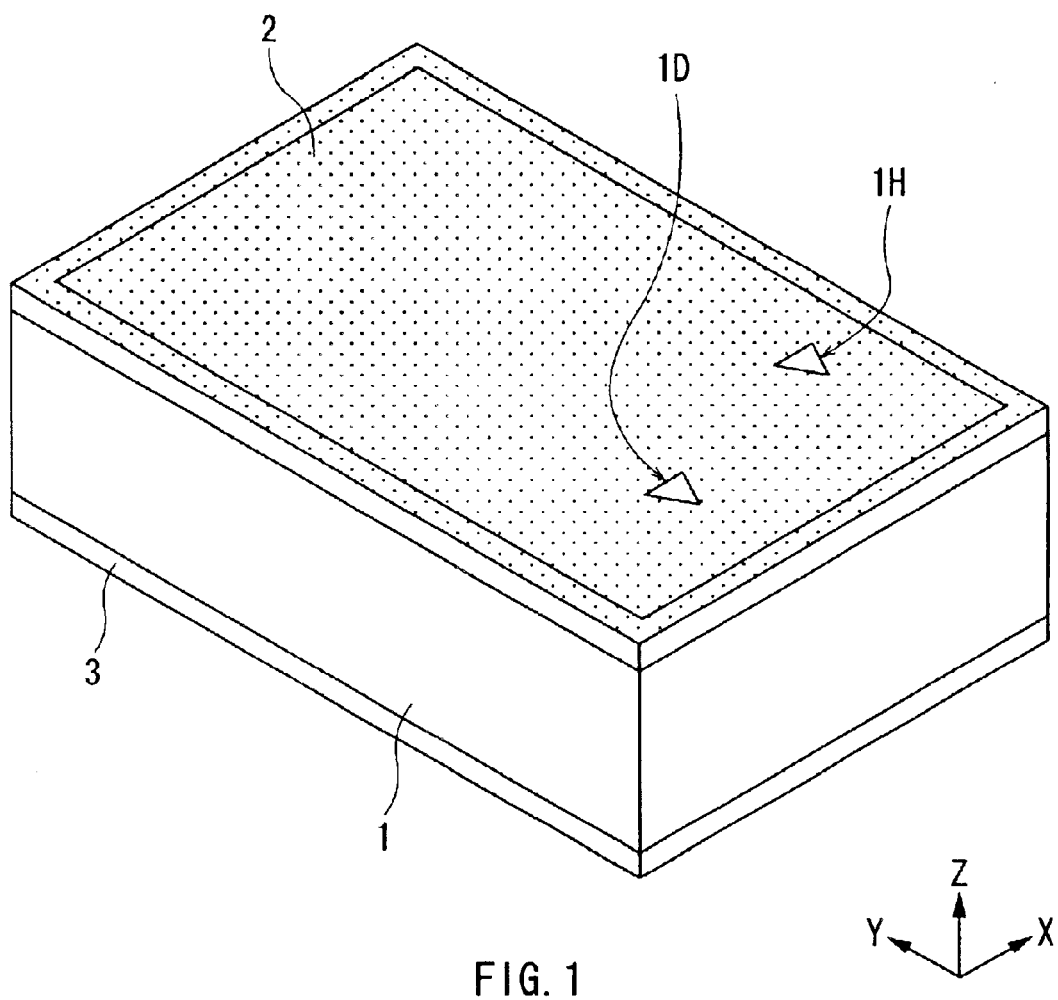
FIG. 1 is an external perspective view of an optical scanner according to an embodiment of the invention.

Firstly, referring to FIGS. 1 through 5, the structure of an optical scanner according to an embodiment of the invention will be described below. FIG. 1 shows an external perspective view of the optical scanner, and FIGS. 2 through 5 show plan views of each part of the optical scanner. FIGS. 2, 3, 4 and 5 show a top cover 2, a bottom cover 3, a top surface of an optical base 1, and a bottom surface of the optical base 1, respectively.

The optical scanner according to the embodiment has a light beam scanning mechanism, and is mounted in an image forming apparatus such as, for example, a full-color laser printer or the like. As shown in FIG. 1, the optical scanner has, for example, a structure in which a series of components (optical components) to be described later are contained in an enclosure including the optical base 1 and two covers (the top cover 2 and the bottom cover 3) with which the optical base 1 is covered.

Figure 4:
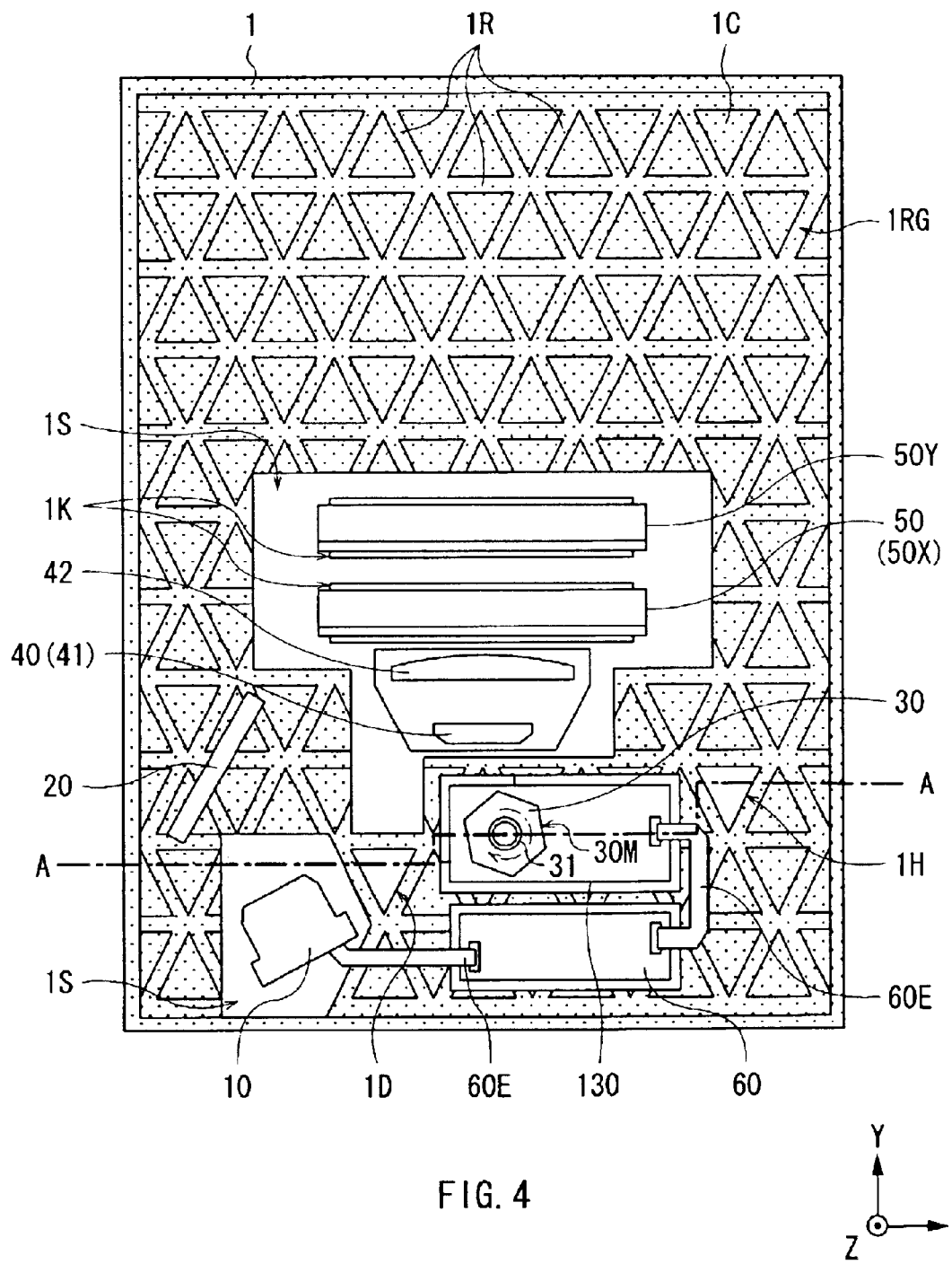
FIG. 4 is a top view of an optical base in the optical scanner according to the embodiment of the invention.
Figure 5:
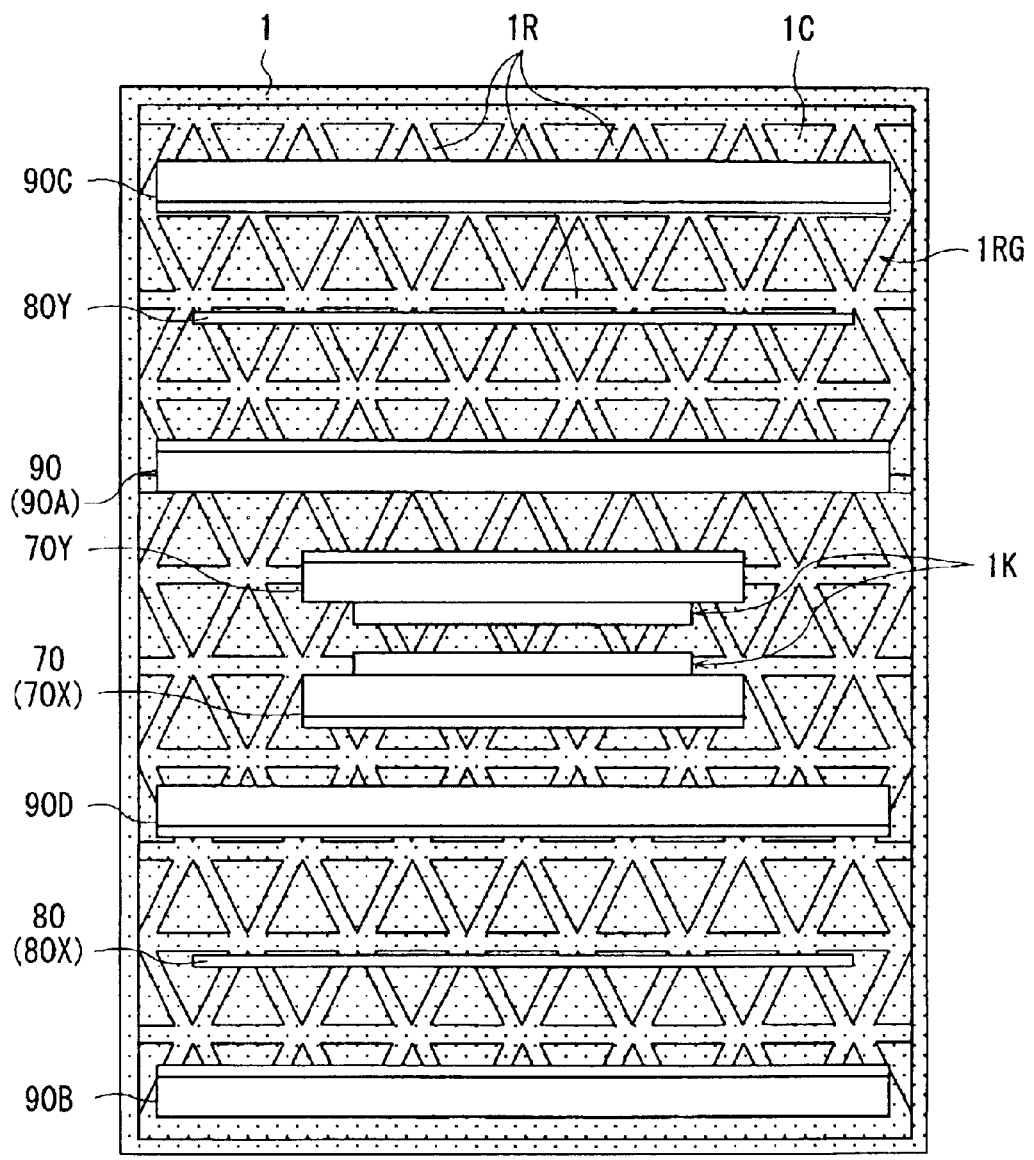
FIG. 5 is a bottom view of the optical base in the optical scanner according to the embodiment of the invention.
Figure 5:
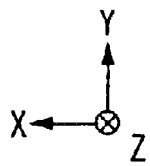

The optical base 1 is a double-sided mounting type base as a base of the optical scanner. As shown in FIGS. 4 and 5, the optical base 1 has a honeycombed strengthening rib structure 1RG having a plurality of ribs 1R which form a polygonal opening, for example, a substantially triangular opening. The strengthening rib structure 1RG is mainly for enhancing mechanical strength of the optical base 1, and has a large number of cells 1C on both sides (the top surface and the bottom surface) of the optical base 1. For example, these cells 1C except for ones used as an inlet 1D and an outlet 1H which will be described later are not pierced. Herein, the rib 1R corresponds to a specific example of "a barrier rib" in the invention, and the cell 1C corresponds to a specific example of "a space surrounded by the barrier ribs" in the invention, and further the strengthening rib structure 1RG corresponds to a specific example of "a strengthening structure" in the invention.

A plurality of mounting spaces 1S, which are formed through removing a predetermined range of the strengthening rib structure 1RG, are disposed in the optical base 1, and a containing chamber 130 for containing a polygon mirror 30 to be described later is disposed in one of the plurality of mounting spaces 1S. Moreover, in the optical base 1, for example, one cell 1C out of the plurality of cells 1C is used as the inlet 1D, and another cell 1C is used as the outlet 1H. Thereby, a passageway 1T to be described later which is passed between the inlet 1D and the outlet 1H (not shown in FIG. 4, refer to FIG. 6) is disposed in the optical base 1. Further, the structure of the containing chamber 130 and its surroundings (including the passageway 1T) will be described in more detail below (refer to FIG. 6). Herein, the containing chamber 130 corresponds to a specific example of "containing portion" in the invention.

Figure 2:
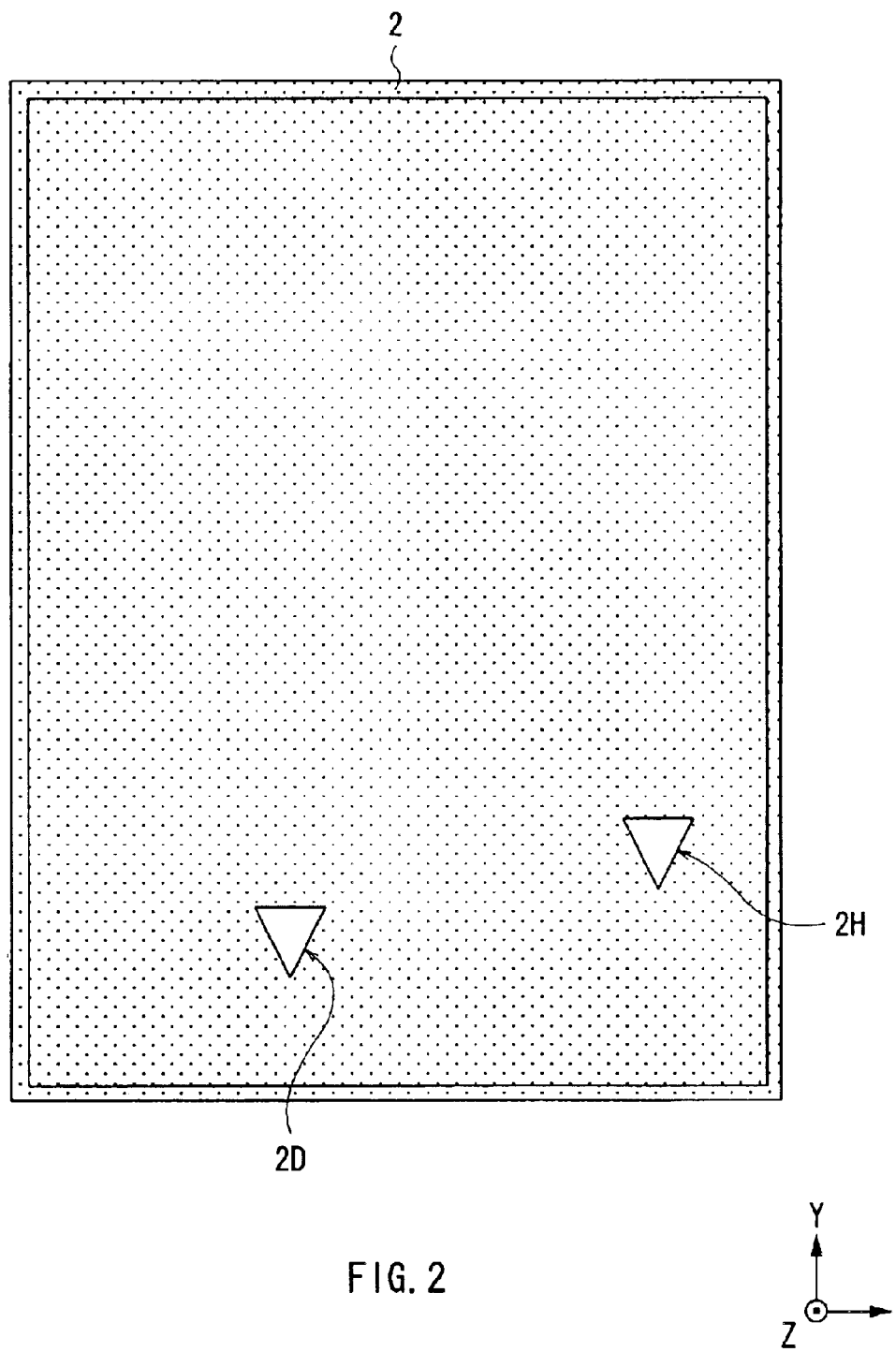
FIG. 2 is a plan view of a top cover of the optical scanner according to the embodiment of the invention.

The top cover 2 is laid above the optical base 1. As shown in FIGS. 1 and 2, in the top cover 2, an opening for introduction 2D and an opening for emission 2H are disposed in position corresponding to the inlet 1D and the outlet 1H disposed in the optical base 1, respectively.

Figure 3:
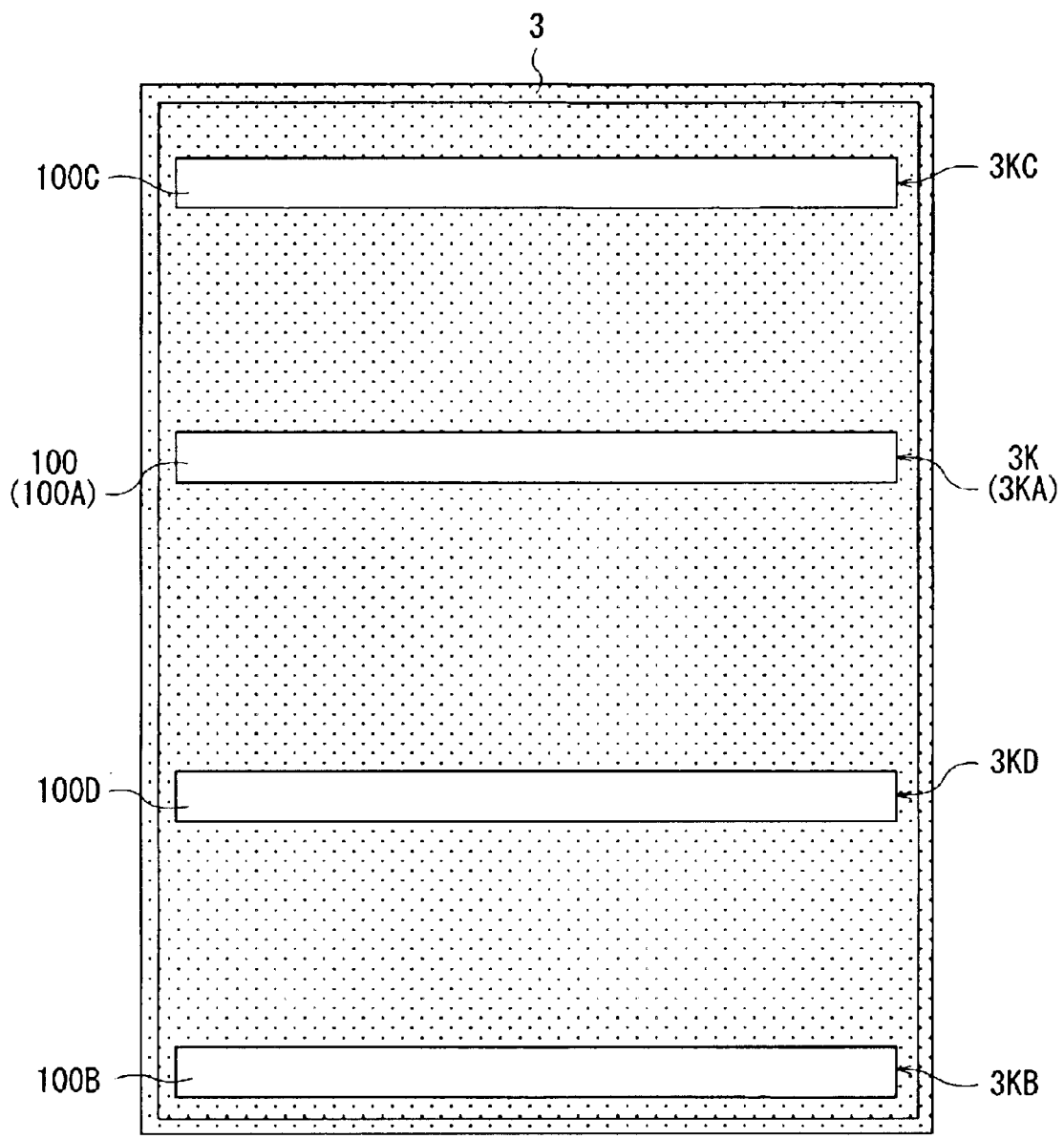
FIG. 3 is a plan view of a bottom cover of the optical scanner according to the embodiment of the invention.

The bottom cover 3 is laid below the optical base 1. As shown in FIG. 3, the bottom cover 3 has four light outlets 3K (3KA, 3KB, 3KC and 3KD) for emitting a laser beam to the outside of the enclosure in positions corresponding to cylindrical mirrors 90 (90A, 90B, 90C and 90D), which will be described later, respectively, and four cover glasses 100 (100A, 100B, 100C and 100D) for dust control are disposed on the light outlets 3KA, 3KB, 3KC and 3KD, respectively.

As shown in FIG. 4, in the mounting spaces 1S which are disposed on the top surface of the optical base 1, mainly a light source apparatus 10, a reflective mirror 20 disposed corresponding to the light source apparatus 10, the polygon mirror 30, a fθ lens 40, a reflective mirror 50 disposed corresponding to the fθ lens 40, and a control circuit board 60 are disposed.

The light source apparatus 10 emits laser beams (light beams) for scanning, and is disposed so that the emitting direction of the laser beams corresponds to the position where the reflective mirror 20 is disposed. The light source apparatus 10 comprises, for example, a laser diode (LD), and is a combination of four light sources corresponding to four colors, that is, yellow (Y), magenta (M), cyan (C) and black (B). Further, the light source apparatus 10 comprises, for example, four sets of a collimator lens, a stop and a cylindrical lens (all not shown) corresponding to the four light sources.

The reflective mirror 20 reflects the laser beams emitted from the light source apparatus 10 toward the polygon mirror 30.

The polygon mirror 30 has, for example, a substantially hexagonal structure having six deflection surfaces 30M, and can rotate around a rotating shaft 31. The polygon mirror 30 deflects the laser beams toward the reflective mirror 50 on each deflection surface 30M according to the rotation of the polygon mirror 30. Herein, the polygon mirror 30 corresponds to a specific example of "a light deflection apparatus" in the invention.

The fθ lens 40 condenses the laser beams in a direction corresponding to a main scanning direction. The fθ lens 40 is a group of a plurality of lenses for keeping a constant scanning speed in the main scanning direction on photosensitive drums 110 (refer to FIG. 8) to be described later, and includes, for example, two lenses 41 and 42 disposed along optical paths of the laser beams.

The reflective mirror 50 reflects the laser beams downward so as to guide the laser beams to the bottom surface of the optical base 1 through an opening 1K disposed in the optical base 1, and the reflective mirror 50 includes, for example, two reflective mirrors 50X and 50Y. The reflective mirrors 50X and 50Y are disposed in different positions from each other, for example, in a height direction (a Z-axis direction in the drawing) (refer to FIG. 8 to be described later).

The circuit board 60 drives the light source apparatus 10 and the polygon mirror 30, and is connected to the light source apparatus 10 and the polygon mirror 30 through a connector cable 60E.

On the bottom surface of the optical base 1, as shown in FIG. 5, mainly a reflective mirror 70 disposed corresponding to the reflective mirror 50, a reflective mirror 80 disposed corresponding to the reflective mirror 70, and a cylindrical mirror 90 are disposed.

The reflective mirrors 70 and 80 reflect the laser beams, which are guided to the bottom surface of the optical base 1 by the reflective mirror 50, toward the cylindrical mirror 90. The reflective mirror 70 includes, for example, two reflective mirrors 70X and 70Y disposed corresponding to the positions where the reflective mirrors 50X and 50Y are disposed, and the reflective mirror 80 includes, for example, two reflective mirrors 80X and 80Y disposed corresponding to the reflective mirrors 70X and 70Y.

The cylindrical mirror 90 reflects the laser beams toward the photosensitive drums 110 (refer to FIG. 8) while condensing the laser beams in a direction corresponding to a sub-scanning direction. The cylindrical mirror 90 includes four cylindrical mirrors 90A, 90B, 90C and 90D, which are disposed at a distance away from one another corresponding to the photosensitive drums 110A, 110B, 110C and 110D.

Figure 6:
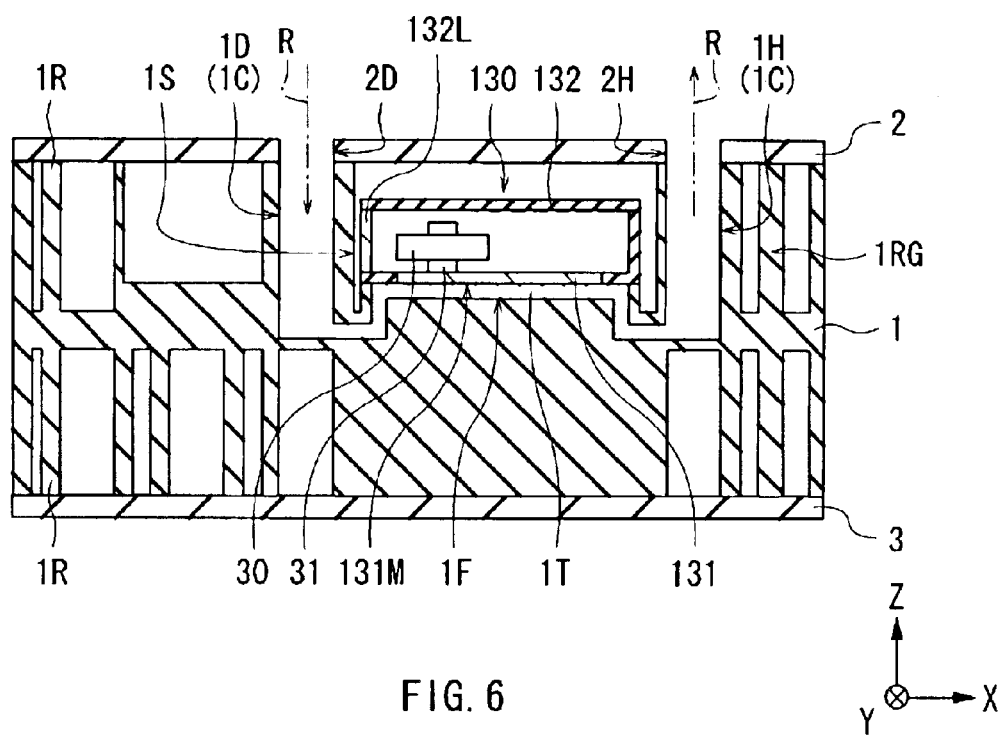
FIG. 6 is a sectional view of a containing chamber and its surroundings in the optical scanner shown in FIG. 4.

Next, referring to FIGS. 4 and 6, the structure of the containing chamber 130 disposed in the optical base 1 and its surroundings will be described in more detail below. FIG. 6 shows a detailed structure of the containing chamber 130 and its surroundings taken along a line A-A shown in FIG. 4. Further, in FIG. 6, a connector cable 60E is not shown.

The containing chamber 130 is disposed in a specific mounting space 1S among the plurality of mounting spaces 1S disposed in the optical base 1, and the specific mounting space 1S is disposed between the inlet 1D and the outlet 1H in a position corresponding to a position where the passageway 1T is laid. The containing chamber 130 has, for example, a box-shaped structure capable of containing the polygon mirror 30, and includes a drive board 131 rotatably supporting the rotating shaft 31 coupled to the polygon mirror 30, and a containing case 132 isolating the polygon mirror 30 together with the drive board 131 from its surroundings, and having a transmission portion 132L for passing the laser beams therethrough. The polygon mirror 30 is contained in the containing chamber 130 so as to be isolated from its surroundings, thereby, adhesion of dust, dirt or the like in the atmosphere to the polygon mirror 30 can be prevented. The drive board 131 includes a motor, a motor drive circuit or the like (not shown) for rotating the polygon mirror 30, and is part of an outer wall of the containing chamber 130. A bottom surface (exposed surface) 131M of the drive board 131 is exposed to the passageway 1T. A flow path 1F of outside air (air) R is a combination of the inlet 1D, the passageway 1T and the outlet 1H, and the air R flowing from outside into the inlet 1D of the optical base 1 through the opening for introduction 2D disposed in the top cover 1 passes through the passageway 1T along the bottom surface 131M of the drive board 131, then the air R is emitted from the outlet 1H to outside through the opening for emission 2H. Herein, the above "outside" means the outside of the enclosure including the optical base 1, the top cover 2 and the bottom cover 3, and also the inside of a printer in which the optical scanner according to the embodiment is mounted. Therefore, as the air R flowing through the flow path 1F, for example, circulating air generated during the operation of a cooling fan or the like mounted in the full-color laser printer is cited. Herein, the drive board 131 corresponds to a specific example of "a supporting body" in the invention, and the flow path 1F (including the inlet 1D, the passageway 1T and the outlet 1H) corresponds to a specific example of "a outside air inlet path" in the invention.

Figure 7:
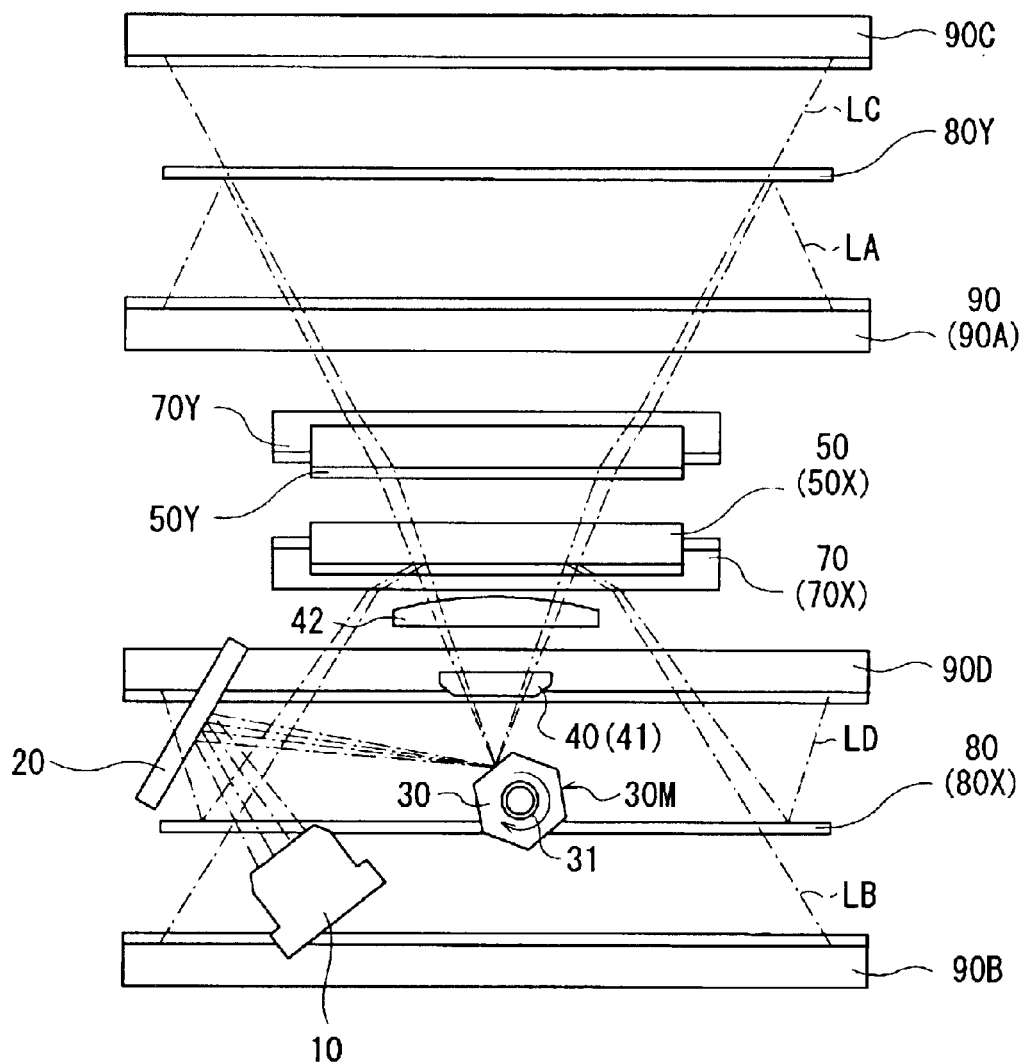
FIG. 7 is a top view of optical paths of laser beams under operating conditions of the optical scanner according to the embodiment of the invention.
Figure 8:
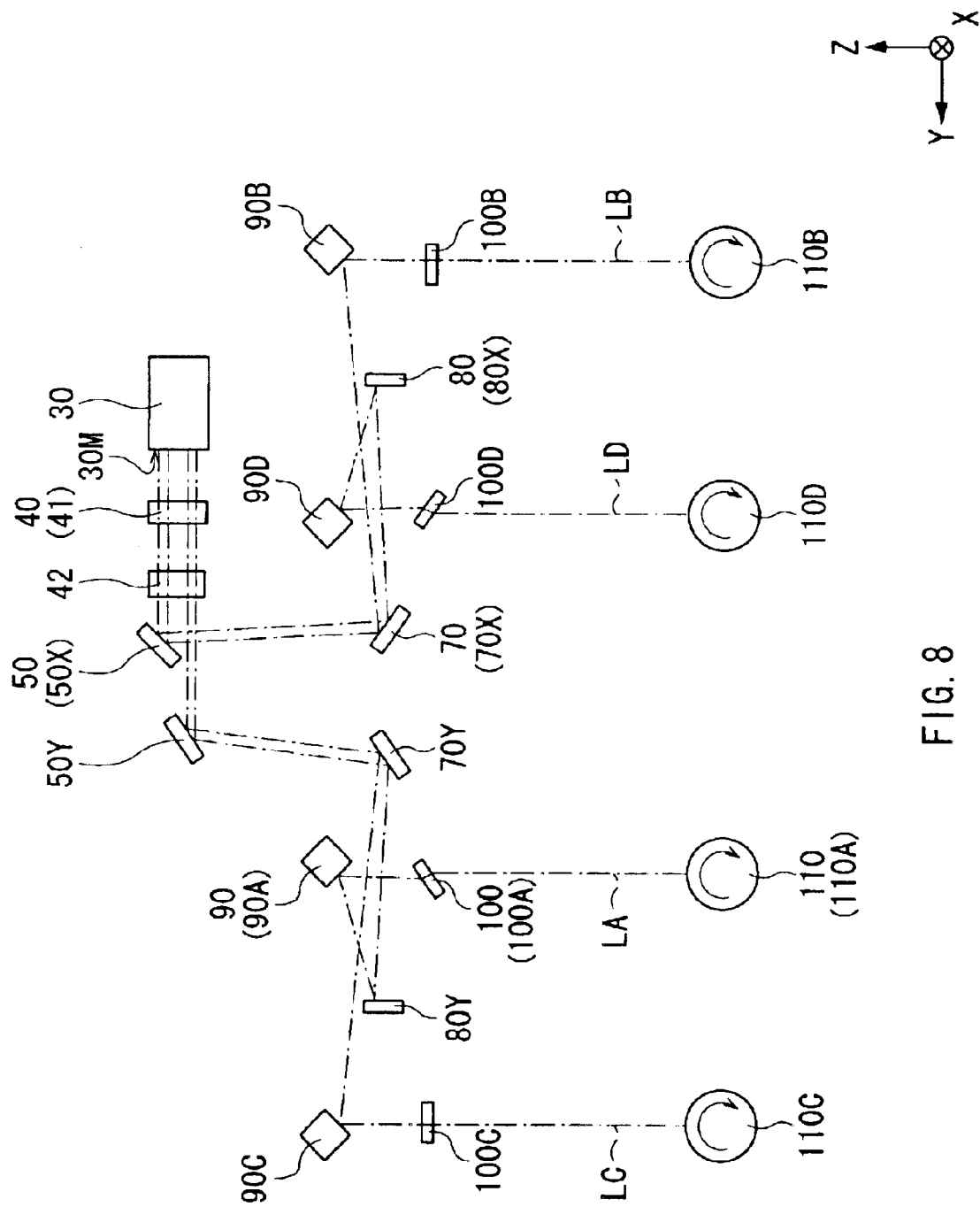
FIG. 8 is a side view of the optical paths of the laser beams under operating conditions of the optical scanner according to the embodiment of the invention.

Next, referring to FIGS. 1 through 8, the operation of the optical scanner will be described below. FIGS. 7 and 8 show optical paths of the laser beams under operating conditions of the optical scanner, and FIG. 7 shows the optical paths when viewed from above, and FIG. 8 shows the optical paths when viewed from the side. FIGS. 7 and 8 show only main components relating to the laser beam scanning mechanism out of the components shown in FIGS. 4 and 5.

In the optical scanner, in a state in which the polygon mirror 30 rotates at constant speed by a motor drive circuit disposed in the drive board 131, firstly, four laser beams LA, LB, LC and LD corresponding to four colors Y, M, C and B are emitted from the light source apparatus 10 disposed on the top surface of the optical base 1. Next, after the laser beams LA, LB, LC and LD emitted from the light source apparatus 10 are reflected by the reflective mirror 20 to be guided toward the polygon mirror 30, the laser beams LA, LB, LC and LD are repetitively reflected and deflected by each deflection surface 30M of the polygon mirror 30. Then, the laser beams LA, LB, LC and LD deflected by the polygon mirror 30 pass through the fθ lens 40 (41 and 42).

The laser beams LB and LD out of the laser beams LA through LD having passed through the fθ lens 40 are reflected by the reflective mirror 50X so as to be guided to the bottom surface of the optical base 1 through the opening 1K, and then the laser beams LB and LD are further reflected by the reflective mirror 70X. After the laser beam LB out of the laser beams LB and LD reflected by the reflective mirror 70X is reflected by the cylindrical mirror 90B, the laser beam LB passes through the cover glass 100B so as to scan the photosensitive drum 110B. On the other hand, after the laser beam LD is reflected by the reflective mirror 80X and the cylindrical mirror 90D in order, the laser beam LD passes through the cover glass 100D so as to scan the photosensitive drum 110D.

Further, after the laser beams LA and LC having passed through the fθ lens 40 are reflected by the reflective mirror 50Y so as to be guided to the bottom surface of the optical base 1 through the opening 1K, the laser beams LA and LC are further reflected by the reflective mirror 70Y. After the laser beam LA out of the laser beams LA and LC reflected by the reflective mirror 70Y is reflected by the reflective mirror 80Y and the cylindrical mirror 90A in order, the laser beam LA passes through the cover glass 100A so as to scan the photosensitive drum 110A. On the other hand, after the laser beam LC is reflected by the cylindrical mirror 90C, the laser beam LC passes through the cover glass 100C so as to scan the photosensitive drum 110C.

According to the above described scanning mechanism, scanned surfaces on the four photosensitive drums 110A, 110B, 110C and 110D as surfaces subjected to scanning are scanned by the four laser beams LA, LB, LC and LD emitted from the light source apparatus 10, respectively.

In the optical scanner according to the embodiment, the containing chamber 130 includes the drive board 131 having the bottom surface 131M exposed to the outside, and supporting the polygon mirror 30, and a flow path 1F formed by using part of the strengthening rib structure 1RG to guide outside air to the bottom surface 131M of the drive board 131. More specifically, the passageway 1T connected between two cells 1C (the inlet 1D and the outlet 1H) is provided in the optical base 1 so as to form the flow path 1F of the air R flowing from the inlet 1D to the outlet 1H through the passageway 1T, and the bottom surface 131M of the driving board 131 forming part of an outer wall of the containing chamber 130 and supporting the polygon mirror 30 is exposed to the flow path 1F (the passageway 1T). In this case, even if the motor and the motor drive circuit provided for rotating the polygon mirror 30 generates heat, the drive board 131 is directly cooled by the air R flowing through the flow path 1F, so a temperature rise in the polygon mirror 30 and its surroundings can be prevented. Further, in the embodiment, the flow path 1F is formed by using the cells 1C of the strengthening rib structure 1RG disposed in the optical base 1, so it is not necessary to separately form the inlet 1D or the outlet 1H. A cooling mechanism using the flow path 1F is effective specifically in the double-sided mounting type optical base 1. Therefore, in the embodiment, based upon the prevention of a temperature rise in the polygon mirror 30 and its surroundings, degradation in the scanning characteristics of the laser beam due to deformation of the enclosure resulting from a temperature difference during heat generation as described above can be prevented, so degradation in image quality of the full-color laser printer in which the optical scanner is mounted can be prevented.

More specifically, in the embodiment, as shown in FIG. 6, even if the containing chamber 130 is not disposed in proximity to the bottom cover 3, but is disposed deep in the recesses of the optical base 1 by using the double-sided mounting type optical base 1, the polygon mirror 30 contained in the containing chamber 130 and its surroundings can be effectively cooled by the air R flowing through the flow path 1F.

In the embodiment, one cell 1C in the strengthening rib structure 1RG is used to form the inlet 1D, and another cell 1C is used to form the outlet 1H, but it is not necessarily limited to this, and two or more cells 1C may be used to form each of the inlet 1D and the outlet 1H. In this case, according to an increased number of cells 1C used, the area of the opening of the inlet 1D or the outlet 1H increases, so the amounts of introduction and emission of the air R increase. Therefore, the cooling performance by the air R can be improved, and thereby, an effect of preventing a temperature rise in the polygon mirror 30 and its surroundings can be further enhanced.

Further, in the embodiment, the cell 1C of the strengthening rib structure 1RG has a substantially triangular opening, but it is not necessarily limited to this. For example, the cell 1C may have a circular opening, a substantially rectangular opening or a substantially hexagonal opening. Also in this case, as in the case of the embodiment in which the cell 1C has a substantially triangular opening, mechanical strength of the optical base 1 can be secured by using the strengthening rib structure 1RG.

The invention is described referring to the embodiment, but the invention is not limited to the embodiment, and can be variously modified.

More specifically, for example, in the embodiment, the case where the optical scanner of the invention is applied to the full-color laser printer is described, but it is not necessarily limited to this, and the optical scanner of the invention is applicable to a single-beam type monochrome laser printer using a single laser beam or a multi-beam type monochrome laser printer using a plurality of laser beams. Moreover, the optical scanner of the invention may be applicable to any other printer except for the laser printer capable of forming an image by using the light beam scanning mechanism, or any other optical apparatus except for the printers. As specific examples of "any other optical apparatus", a facsimile, a copying machine, a combination thereof, or the like is cited.

As described above, in the optical scanner according to the invention, the supporting body forming part of a containing portion and supporting the light deflection apparatus is exposed to the outside air inlet path formed by using part of the strengthening structure, so outside air is guided to the exposed surface of the supporting body through the outside air inlet path. In this case, even if the containing portion is not disposed in proximity to the outer surface of the enclosure, but is disposed deep in the recesses of the enclosure, the light deflection apparatus contained in the containing portion and its surroundings are effectively cooled by outside air flowing through the outside air inlet path so as to prevent a temperature rise in the light deflection apparatus and its surroundings, thereby, the scanning characteristics of the light beam can be maintained. Moreover, the outside air inlet path is formed by using part of the strengthening structure disposed in the enclosure, so it is not necessary to separately form the outside air inlet path, and the outside air inlet path can be easily formed. Therefore, for example, in the full-color laser printer in which the optical scanner is mounted, degradation in image quality can be prevented.

Obviously many modifications and variations of the present invention are possible in the light of the above teachings. It is therefore to be understood that within the scope of the appended claims the invention may be practiced otherwise than as specifically described.

What is claimed is:

1. An optical scanner, comprising:

a light deflection apparatus deflecting a light beam for scanning a scanned surface; and an enclosure including a strengthening structure for enhancing mechanical strength and a containing portion containing the light deflection apparatus therein, wherein the containing portion includes a supporting body having an exposed surface exposed to outside, and supporting the light deflection apparatus, and an outside air inlet path for guiding outside air to the exposed surface of the supporting body is formed by using part of the strengthening structure.

2. An optical scanner according to claim 1, wherein the strengthening structure has a honeycombed structure including a plurality of barrier ribs, and the outside air inlet path is formed by using a space surrounded by the barrier ribs.

3. An optical scanner according to claim 2, wherein the space surrounded by the barrier ribs has a polygonal sectional shape.

* * * * *

UNITED STATES PATENT AND TRADEMARK OFFICE
CERTIFICATE OF CORRECTION

PATENT NO. : 6,943,926 B2  
APPLICATION NO. : 10/452450  
DATED : September 13, 2005  
INVENTOR(S) : Mitsuhiro Ohno and Masanobu Yamamoto Page 1 of 1

It is certified that error appears in the above-identified patent and that said Letters Patent is hereby corrected as shown below:

On the title page:

Under (73) Assignee

Add --Sharp Kabushiki Kaisha--.

Signed and Sealed this

Fourth Day of November, 2008

JON W. DUDAS  
*Director of the United States Patent and Trademark Office*